United States Patent
Takach (10) Patent No.: US 9,844,880 B1
(45) Date of Patent: Dec. 19, 2017

(54) UNMANNED VEHICLE RETROFITTING APPLIQUE ASSEMBLY

(71) Applicant: Kairos Autonomi, Sandy, UT (US)

(72) Inventor: George A. Takach, Sandy, UT (US)

(73) Assignee: KAIROS AUTONOMI, INC., Sandy, UT (US)

( * ) Notice: Subject to any disclaimer, the term of this patent is extended or adjusted under 35 U.S.C. 154(b) by 0 days.

(21) Appl. No.: 14/820,337

(22) Filed: Aug. 6, 2015

Related U.S. Application Data (60) Provisional application No. 62/034,562, filed on Aug. 7, 2014.

(51) Int. Cl.
*B25J 9/16* (2006.01)
*B25J 9/00* (2006.01)

(52) U.S. Cl.
CPC ........... *B25J 9/1679* (2013.01); *B25J 9/0009* (2013.01); *Y10S 901/30* (2013.01)

(58) Field of Classification Search
CPC ......... B25J 9/1679; B25J 9/009; Y10S 901/30
See application file for complete search history.

(56) References Cited

U.S. PATENT DOCUMENTS

| | | | | |
|---|---|---|---|---|
| 4,742,720 A | | 5/1988 | Storck | |
| 5,172,589 A | * | 12/1992 | Witt | B60K 41/282 73/132 |
| 5,270,628 A | * | 12/1993 | Noguchi | G09B 9/04 123/436 |
| 5,363,027 A | * | 11/1994 | Noguchi | F16H 61/28 318/266 |
| 5,372,035 A | * | 12/1994 | Ogawa | B60S 5/00 73/115.01 |
| 5,816,106 A | * | 10/1998 | Froelich | B60K 20/00 74/335 |
| 5,821,718 A | * | 10/1998 | Shaffer | G05G 1/54 180/6.5 |
| 5,835,867 A | * | 11/1998 | Froelich | B60T 17/223 296/65.02 |
| 5,865,266 A | * | 2/1999 | Froelich | B25J 9/1689 180/443 |
| 5,913,945 A | * | 6/1999 | Froelich | G05G 1/46 254/DIG. 5 |

(Continued)

OTHER PUBLICATIONS

Autofarm, "Simple and Reliable Hands-Free GPS Assisted Steering," no date, 2 pages. http://www.cultiva.com/ _resources/uploads/files/OnTRac%20quality.pdf.

(Continued)

*Primary Examiner* — Khoi Tran
*Assistant Examiner* — Robert Nguyen
(74) *Attorney, Agent, or Firm* — Thorpe North & Western, LLP (57) ABSTRACT

A robotic applique assembly for incorporation into a manually controlled vehicle to provide unmanned operational capability to the vehicle includes an assembly body configured to be positioned into the vehicle in substantially the same area occupied by a user of the vehicle. The assembly body can have a series of segments including a torso segment, a bench segment and a leg segment. The segments are pivotally coupled one to another to allow adjustment of position of the segments relative to one another.

18 Claims, 6 Drawing Sheets

(56) References Cited

U.S. PATENT DOCUMENTS

| | | | | |
|---|---|---|---|---|
| 5,991,674 | A | * | 11/1999 | Froelich ............ G01M 17/0074 192/218 |
| 6,141,603 | A | * | 10/2000 | Greenhill ................ G01L 5/22 318/587 |
| 6,633,800 | B1 | | 10/2003 | Ward et al. |
| 6,988,583 | B2 | | 1/2006 | Turner |
| 7,349,779 | B2 | | 3/2008 | Nelson |
| 7,431,325 | B2 | | 10/2008 | Stahle |
| 7,894,951 | B2 | | 2/2011 | Norris et al. |
| 8,255,093 | B2 | * | 8/2012 | Layton ................ G05D 1/0038 701/2 |
| 2008/0179115 | A1 | * | 7/2008 | Ohm ........................ B25J 5/005 180/9.21 |
| 2008/0246310 | A1 | * | 10/2008 | Staehle ............ G01M 17/0074 296/190.01 |
| 2009/0099710 | A1 | | 4/2009 | Takach, Jr. |
| 2011/0061963 | A1 | * | 3/2011 | Farwell .................... B62D 1/00 180/400 |
| 2011/0240382 | A1 | * | 10/2011 | Gettings .............. B62D 55/075 180/9.1 |
| 2011/0266076 | A1 | * | 11/2011 | Morey .................. B62D 55/06 180/9.32 |

OTHER PUBLICATIONS

Axion, LLC. "DARPA Grand Challenge 2005, Technical Paper," Aug. 11, 2005, 13 pages, http://www.darpa.mil/grandchallenge05/techpapers.html.

Castleton, Karl, et al., Technical Paper Team Mojavaton Car #1, DARPA Grand Challenge 2005, Aug. 28, 2005, 8 pages, http://www.darpa.mil/grandchallenge05/techpapers.html.

Cultiva, "Press Release Cultiva OnTrac Auto-Steering," Nov. 18, 2004, 2 pages, http://www.innotag.com/pdf/20041201communiquieA.pdf.

Klarquist, William, et al., "Intelligent Vehicle Safety Technologies 1 Technical Description," Aug. 29, 2005, 23 pages, http://www.darpa.mil/grandchallenge05/techpapers.html.

Mason, Richard, "The Golem Group/UCLA, DARPA Grand Challenge Technical Paper," 2005.

Mitchell Repair Information Company; Steering Columns, Honda Accord, Civic & Prelude; 2003; 2 pages; Mitchell Repair Information Company.

Murray, Richard M., et al, "DARPA Technical Paper: Team Caltech," Aug. 29, 2005, 14 pages, http://www.darpa.mil/grandchallenge05/techpapers.html.

Stanford Racing Team, "Stanford Racing Team's Entry in teh 2005 DARPA Grand Challenge," 2005, no moth, no day, 14 pages, http://www.darpa.mil/grandchallenge05/techpapers.html.

Stout, Cherry Brieser, "New OnTrac System Features Ease of Use, " 2006, 03, no day, 1 page, http://magissues.farmprofess.com/mif/MF03Mar06/mif26.pdf.

Team Terramax, "Team Terramax, DARPA Grand Challenge 2005," 2005, no month, no day, 14 pages, http://www.darpa.mil/granchallenge05/techpapers.html.

Trepagnier, Paul G., et al., "Team Gray Technical Paper, DARPA Grand Challenge 2005," Aug. 28, 2005, 13 pages, http://www.darpa.mil.grandchallenge05/techpapers.html.

Wicks, Albert, et al., "Virginia Tech Team Rocky DARPA Grand Challenge 2005," 2005, no month, no day, 13 pages, http://www.darpa.mil/granchallenge05/techpapers.html.

* cited by examiner

UNMANNED VEHICLE RETROFITTING APPLIQUE ASSEMBLY

PRIORITY CLAIM

Priority is claimed of and to U.S. Provisional Patent Application Ser. No. 62/034,562, filed Aug. 7, 2014, which is hereby incorporated herein by reference in its entirety.

RELATED APPLICATIONS

This application is related to U.S. patent application Ser. No. 11/895,639, filed Aug. 24, 2007, now issued as U.S. Pat. No. 8,983,680, and U.S. patent application Ser. No. 12/760,801, filed Apr. 15, 2010, each of which is hereby incorporated herein by reference in its entirety.

BACKGROUND OF THE INVENTION

Field of the Invention

The present invention relates generally to systems that can be incorporated within an existing vehicle, surface vessel or aircraft to provide the vehicle or aircraft with unmanned operational capability.

Related Art

Unmanned vehicles are vehicles that are operational without a human operator being present within the vehicle. The numerous benefits of such vehicles are becoming increasingly appreciated. Unmanned vehicles can be used to perform tasks that might otherwise expose human operators to unacceptable risks, as well as tasks so mundane that the presence of human operators may be a waste of resources. Use of these vehicles can be beneficial in a variety of hazardous environments including combat areas, hazardous waste areas, etc. As an example of the burgeoning acceptance of such vehicles, the United States Congress mandated in 2001 that one-third of all military land vehicles be autonomous by the year 2015, and that two-thirds be autonomous by the year 2025.

In response to the need for such vehicles, a variety of unmanned ground vehicles ("UGVs") have been developed. While work with conventional UGVs has advanced the science behind the design, manufacture and operation of such vehicles, conventional UGVs suffer from a number of disadvantages. For example, most UGVs are designed and built solely for use as UGVs and, as such, are often very expensive to build and complex to operate. Also, most conventional UGVs are not manually operable by human drivers (e.g., a human operator can not easily or quickly assume local, manual control of the vehicle). In addition, conventional UGVs are generally clearly identifiable as such: a disadvantage when it may be desirable to conceal from unfriendly factions the fact that a vehicle is unmanned. Furthermore, most UGVs have conventionally been committed to unmanned use: as such, the asset was limited to such use and could not also be used in manual control.

SUMMARY OF THE INVENTION

In accordance with one embodiment, the technology provides a robotic applique assembly for incorporation into a manually controllable vehicle to provide unmanned operational capability to the vehicle. The applique assembly can include an assembly body configured to be positioned into the vehicle in an area normally occupied by a user of the vehicle. The assembly body can have a series of segments including: a torso segment, a bench segment and a leg segment. The segments can be pivotally coupled one to another to allow adjustment of position of the segments relative to one another.

In accordance with another aspect of the invention, a robotic applique assembly is provided for incorporation into a manually controllable vehicle to provide unmanned operational capability to the vehicle. The applique assembly can include a torso segment positionable in a seat of the manually controllable vehicle, the torso segment including a rotatable hub associated therewith. A steering extension can be coupleable to the rotatable hub of the torso segment, the steering extension sized to extend from the torso segment to an area adjacent a steering wheel of the manually controllable vehicle. A steering plate can be coupleable to the steering extension and to a steering wheel of the manually controllable vehicle. The steering plate, steering extension and rotatable hub can cooperatively allow unmanned control of the steering system of the manually operable vehicle.

In accordance with another aspect of the invention, a method of providing unmanned operational capability to a manually controllable vehicle is provided, including: positioning a bench segment of an assembly body upon a seat portion of a seat of the vehicle; positioning a torso segment of the assembly body against a back rest portion of the seat of the vehicle; extending a leg segment of the assembly body downwardly from the seat portion of the seat of the vehicle toward foot pedals of the vehicle; and engaging the foot pedals of the vehicle with legs extending from the leg segment of the assembly body to enable operation of the foot pedals by the legs.

There has thus been outlined, rather broadly, relatively important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Before the present invention is disclosed and described, it should be understood that this invention is not limited to the particular structures, process steps, or materials disclosed herein, but is extended to equivalents thereof as would be recognized by those of ordinarily skill in the relevant arts. It should also be understood that terminology employed herein is used for the purpose of describing particular embodiments only and is not intended to be limiting in any way.

It must be noted that, as used in this specification and the appended claims, the singular forms "a" and "the" include plural referents, unless the context clearly dictates otherwise. Thus, for example, reference to a "controller" can, but does not necessarily, include one or more of such controllers.

Definitions

In describing and claiming the present invention, the following terminology will be used in accordance with the definitions set forth below.

As used herein, the term "vehicle" is to be understood to refer to a variety of vehicles, including, without limitation, automobiles, trucks, SUVs, boats, aircraft, etc. Generally, the present invention can be utilized with substantially any steering-wheel based vehicle, including land- and water-based vehicles, amphibious vehicles and the like. Generally, when "vehicles" are referred to herein, the vehicle at issue is normally operable by a human. In many embodiments, the vehicle remains operable by a human after installation of the present technology.

As used herein, the term "unmanned" is used to describe a condition in which components of a vehicle are operable without requiring the presence of a human in the vehicle. While a human may in fact tele-operate the vehicle from afar, he or she is not situated within the vehicle while doing so. In this case, the vehicle is unmanned for purposes of the present discussion.

As used herein, the term "substantially" refers to the complete or nearly complete extent or degree of an action, characteristic, property, state, structure, item, or result. The exact allowable degree of deviation from absolute completeness may in some cases depend upon the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

Distances, angles, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. This same principle applies to ranges reciting only one numerical value and should apply regardless of the breadth of the range or the characteristics being described.

The Invention

The present invention is directed to systems and methods that allow users to convert a conventional, manually operated vehicle to a remotely piloted vehicle, a remotely guided vehicle, or an autonomously guided vehicle. Generally speaking, the invention provides a robotic applique assembly (or kit) that can be installed in an otherwise operable, conventional vehicle to allow the vehicle to be operated in an unmanned mode, thus resulting in a Remotely Piloted Vehicle (RPV), a Remotely Guided Vehicle (RGV) or an Autonomously Guided Vehicle (AGV), to name but a few. The resultant modified vehicle can be used in a wide range of operations including, without limitation, training operations, construction, tactical and security operations, environmentally hazardous operations, etc. The term "vehicle," as used herein, is intended to encompass a variety of ground-based, water-based and air-based craft. Non-limiting suitable applications thus include boats, aircraft, ground-based automobiles, trucks, etc.

The applique assembly robotic kit converts such existing human-drivable vehicles into remotely operated vehicles. The assembly can be positioned in a driver's seat of a vehicle and can control the vehicle's steering, brake, throttle and transmission. It can be installed in an unmodified vehicle in about ten minutes or less to provide tele-operation and GPS path following control. The ability for rapid installation allows for a semi-permanent installation in a vehicle, which releases the user from committing to one vehicle platform or a particular vehicle. By reducing the installation time, a vehicle need not be committed to robotic use. This frees the vehicle to be used in manual (i.e., "normal") mode or robotic mode as the user or operator sees fit. This greatly reduces the costs associated with such vehicles, as a separate vehicle need not be purchased and dedicated for robotic use. Any particular vehicle can be used robotically one day, and normally the next, or converted back and forth several times on any given day.

As shown generally in the appended figures, in one aspect of the invention, a robotic applique assembly 10 is provided that can be incorporated into a manually controlled vehicle to provide unmanned operational capability to the vehicle. The assembly body can be configured to be positioned into the vehicle in substantially the same area occupied by a user of the vehicle in ordinary course of operation of the vehicle.

Figure 3:
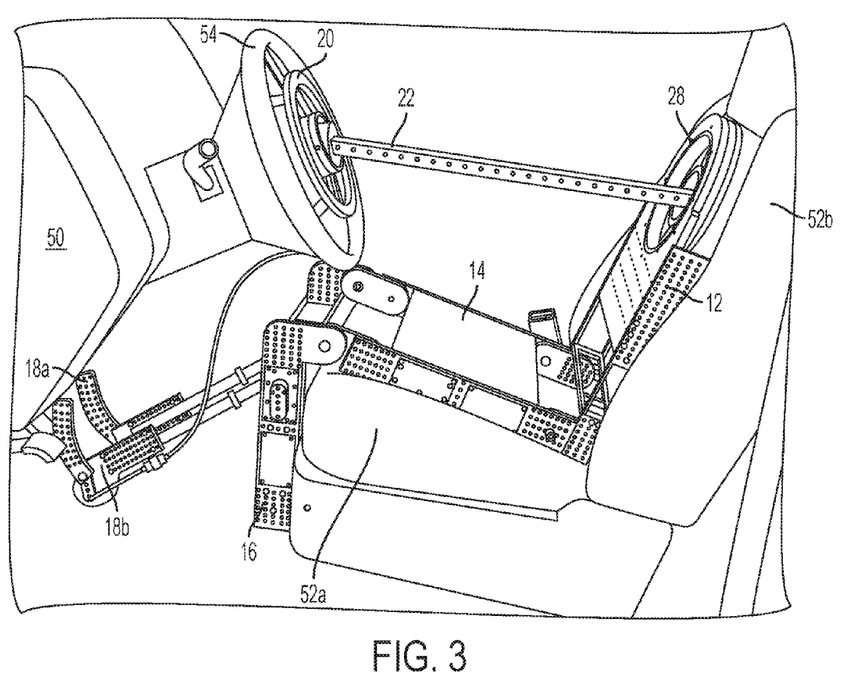
FIG. 3 is a side perspective view of the assembly of FIG. 1, as installed in a vehicle seat.
Figure 6:
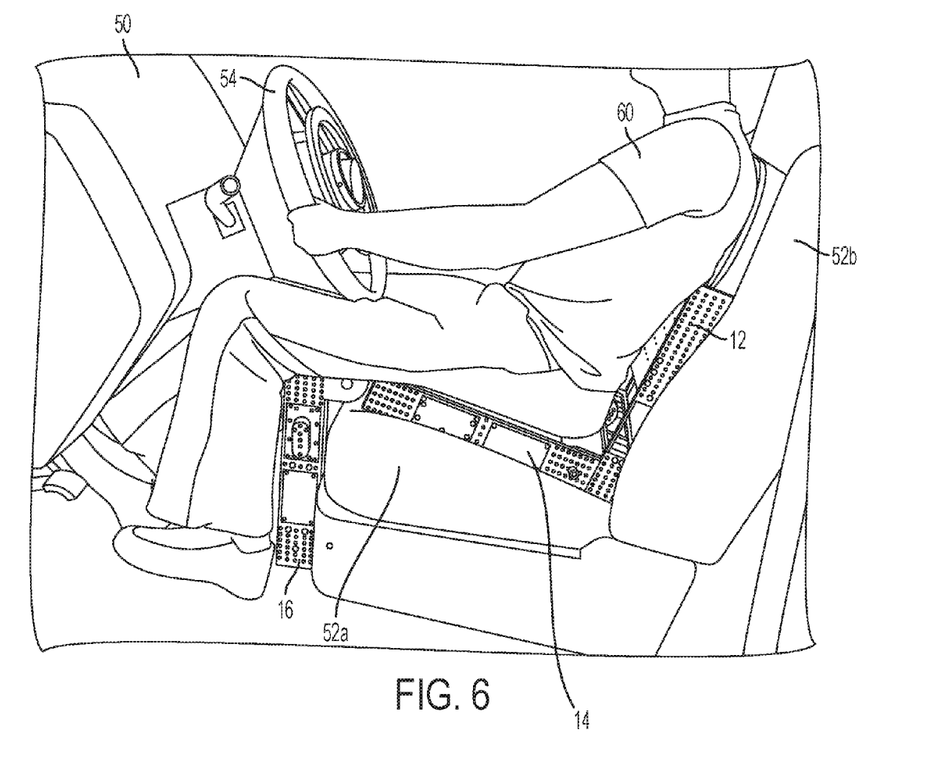
FIG. 6 is a side perspective view of the assembly of FIG. 1 installed within a vehicle, with an operator seated atop the assembly.

Portions of one exemplary vehicle with which the present technology can be used is shown at 50 in FIGS. 3 and 6. The vehicle typically includes a seat, which for the present purposes includes a seat portion 52a (FIGS. 3 and 6) and a back portion 52b (FIGS. 3 and 6). The assembly body 10 can include a variety of body segments. In the example shown, the assembly includes a torso segment 12 that can be positioned approximately in the same area of a seat in which a user's torso would be positioned when operating the vehicle (see, for example, back portion 52b in FIGS. 2, 3 and 6). A bench segment 14 can be connected to or associated with the torso segment and can occupy the space in the vehicle in which the user's buttocks and thighs would be positioned (see, for example, seat portion 52a in FIGS. 3 and 6). A leg segment 16 can be connected to or otherwise be associated with the bench segment and can occupy approximately the same space as would the user's legs.

Figure 1:
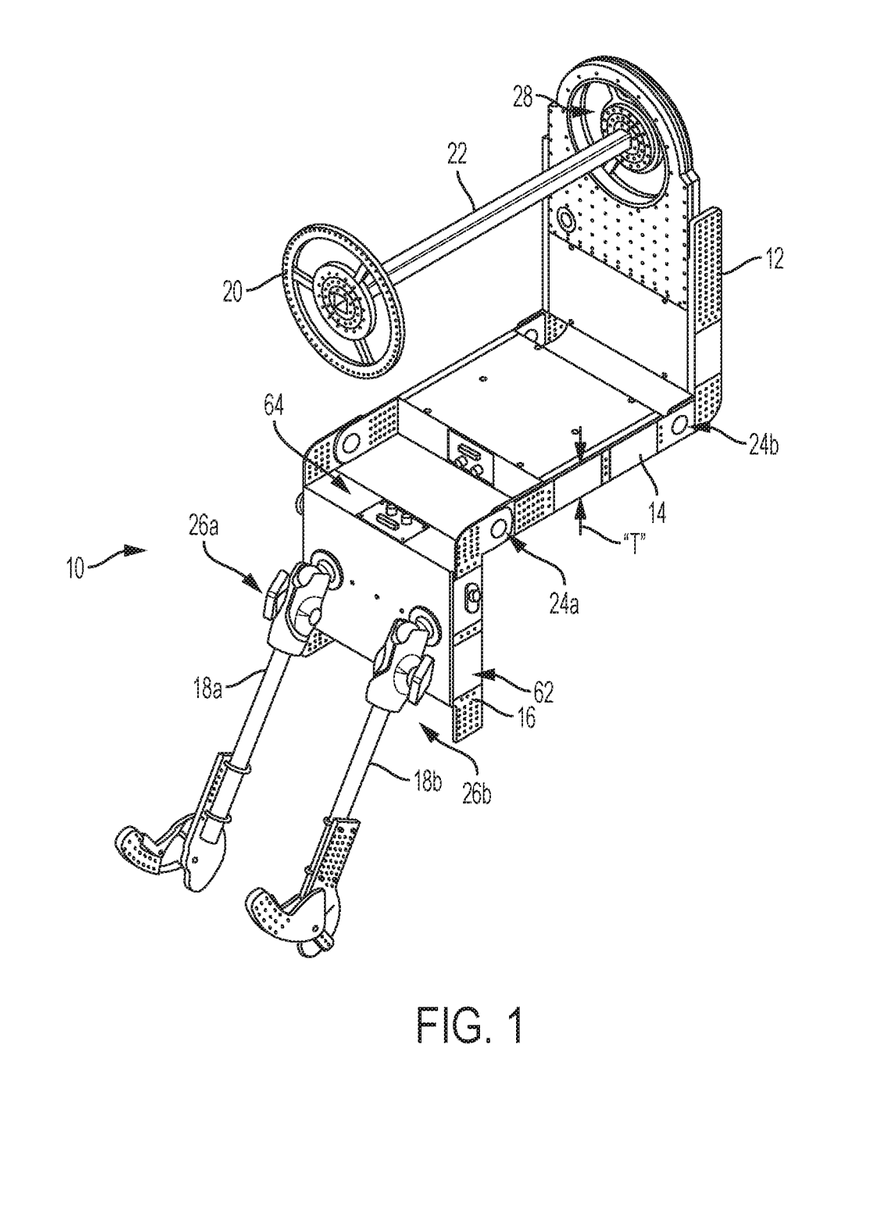
FIG. 1 is a perspective view of a robotic applique assembly in accordance with an embodiment of the invention.
Figure 2A:
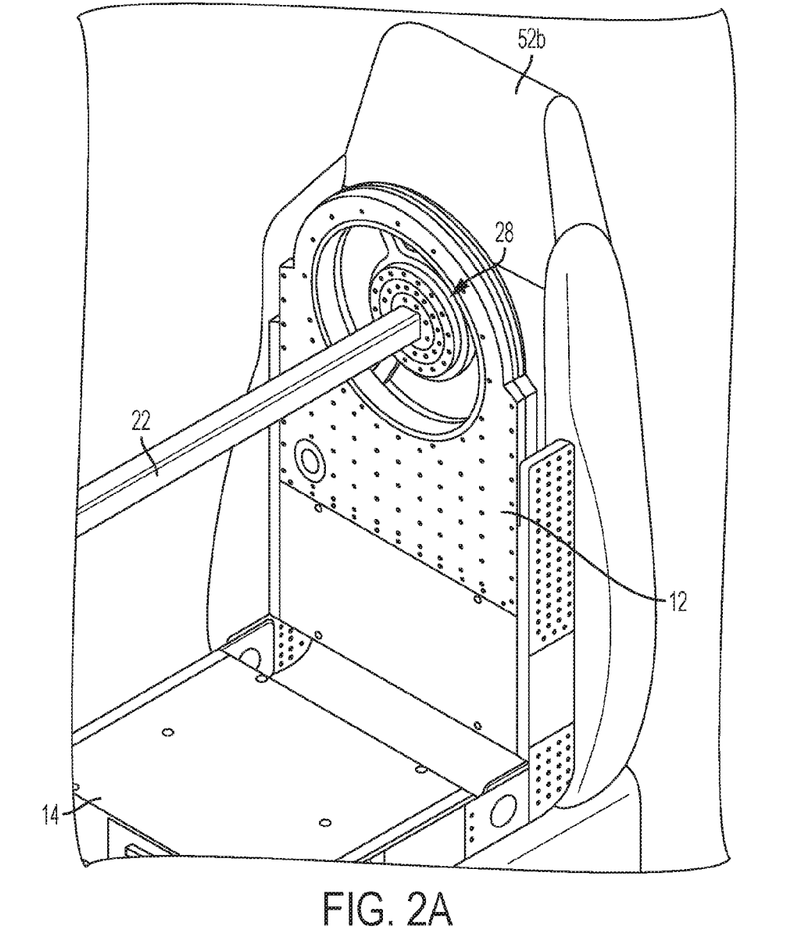
FIG. 2A is a perspective view of a portion of the assembly of FIG. 1, as installed in a vehicle seat.
Figure 2B:
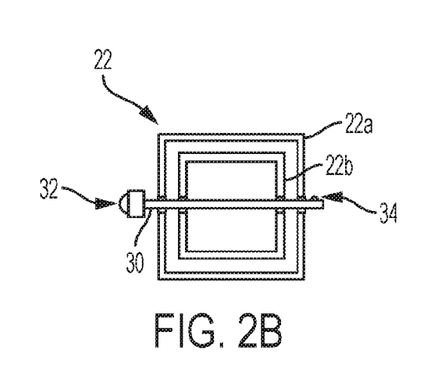
FIG. 2B is a sectioned view of a steering extension of FIG. 2A.

While not so required, in one aspect of the invention, the various segments are pivotally coupled one to another to allow adjustment of position of the segments relative to one another. This can allow the system to be readily adapted for a variety of sizes and types of vehicle seats. The rotatability or pivotability of the various segments relative to one another can be accomplished in a variety of manners. In the example shown in FIG. 1, a series of pivot joints 24a, 24b, etc., are provided that allow the components to rotate relative to one another. This feature can be advantageous not only in allowing the segments to be adjusted relative to one another to properly fit the seat of the vehicle, but also allows the device to be compactly folded for transport and storage.

Figure 4:
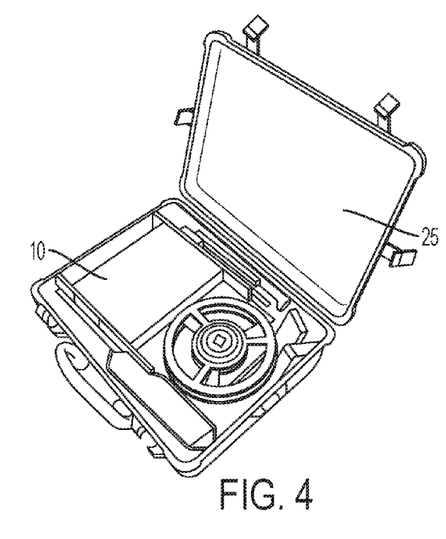
FIG. 4 is a top perspective view of the assembly of FIG. 1, folded into a storage configuration in a carrying case.

FIG. 4 illustrates one exemplary storage position of the device 10. As can be seen, the entire device can be folded into a very compact size when not deployed. In one exemplary embodiment, the folded device can fit within a suitcase-sized package 25. This compact, folded configuration can have a total width of about sixteen inches, a total height of about ten inches, and a total depth of about twenty-three inches. The entire package can include a total weight of less than about fifty pounds.

The compact storage and travel aspect of the invention can be accomplished due to the relatively thin body segments. In one embodiment, each of the segments has a thickness ("T" in FIG. 1) of less than about 2.75 inches. As will be appreciated from the example shown, the pivot joints 24a, 24b and surrounding structure can be configured to allow the torso segment 12 to fold atop the bench segment 14, while the leg segment 16 can fold beneath the bench segment. Other suitable folding configurations can also be achieved utilizing the features shown.

The assembly 10 can also include a steering linkage 22 that can be coupleable to the torso segment 12 via rotatable hub 28. The rotatable hub can include one or more components to which the steering linkage can be coupled that are rotatable relative to the torso segment. The steering linkage can also be coupleable to a steering wheel (54 in FIGS. 3 and 6) of the vehicle, to allow the steering wheel to be controlled by the applique assembly. The assembly can include a steering plate 20 that can be coupled to the steering wheel in a variety of manners. One exemplary attachment mechanism is the use of straps to secure the plate to the wheel while allowing the wheel to rotate as it normally would. The steering linkage can be removably coupled to the steering plate, via a number of connection mechanisms known in the art.

Thus, the steering linkage 22 can be removed from both the steering wheel 54 and the torso segment 12 and be removed from the vehicle 50 while the remaining components of the applique assembly remain in the vehicle. As discussed below, the legs 18a, 18b can also be removable from the leg segment 16. In this manner, the applique assembly can very quickly (within a matter of minutes) be adapted to allow a user to take control of the vehicle. This situation is illustrated in FIG. 6, where it can be seen that user 60 can very easily be seated upon the seat segment 14, against the torso segment 12 and leg segment 16. A user can thus take command of the vehicle with very little effort.

The steering extension 22 can be adjustable in length to provide optimal interface with a wide range of vehicle sizes and types. As shown for example in FIG. 2B, this can be accomplished in one embodiment by telescoping members 22a and 22b. Telescoping member 22b can slide within 22a to allow the overall length to be adjusted. One or more pins 30 can be utilized to retain the telescoping members in position relative to one another. The pin can include a ball 34 that can be retracted by activating button 32 to allow the pin to be removed from the telescoping member. Pins such as that shown can be utilized to selectively lock the telescoping members relative to one another. Alternate mechanisms can also be used to provide adjustability, including threaded connectors, clamps, etc.

One or more moveable feet 18a, 18b can be coupleable to the leg segment 16. The moveable feet can be positionable so as to be able to control one or more foot pedals (as shown for example in FIG. 3) of the vehicle 50. While not so required, in one aspect of the invention, the moveable feet can be removably coupleable to the leg segment. In this manner, the feet can be removable to allow very compact carriage and storage of the assembly. This can be accomplished, for example, via ball and socket joints 26a, 26b (FIG. 1) that allow a user to quickly and securely couple the moveable feet to the leg segment. Generally, the moveable feet, once positioned properly, simply engage the foot pedals of the vehicle in much the same manner as a user's feet would. Where desirable, however, the moveable feet can be secured to the foot pedals, via straps, clamps, threaded connectors, etc.

Figure 5A:
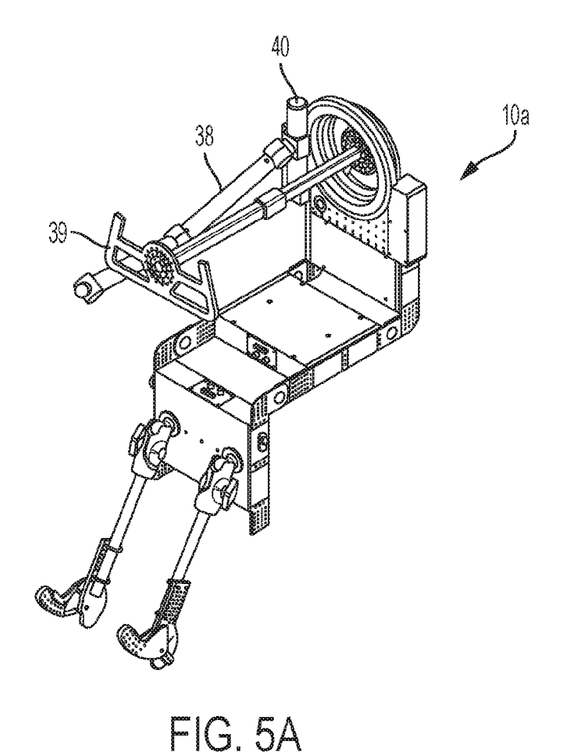
FIG. 5A is a perspective view of the assembly of FIG. 1, having an optional control arm incorporated therein.
Figure 5B:
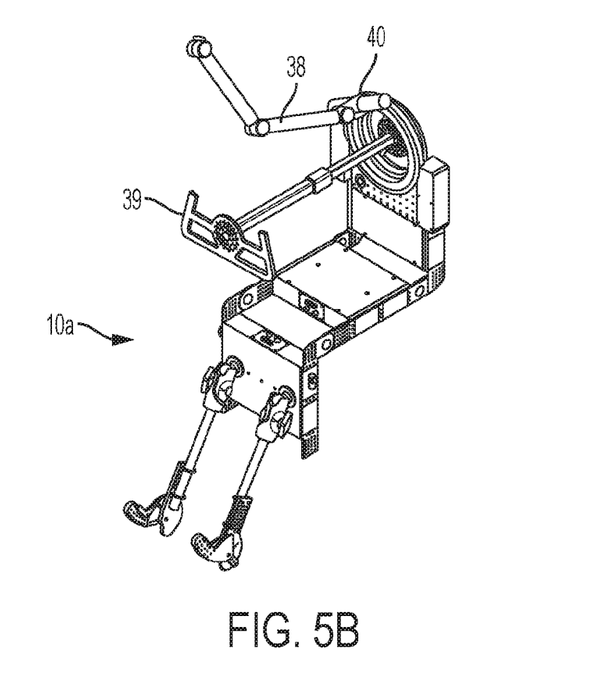
FIG. 5B is a perspective view of the assembly of FIG. 5A, with the control arm in an alternate position.

As shown in FIGS. 5A and 5B, in one aspect of the invention an additional control arm 38 can be provided. This control arm can function well in vehicles that include a steering yoke 39. The control arm can provide push/pull functionality, as well as turning capability. In one example, a control arm module 40 can be provided that rotates relative to (or with) the rotatable hub 28 to provide the motion to the control arm.

The rotatable hub 28 can be configured in a variety of manners. In one embodiment, the hub is a gimbal assembly that can account for any misalignment between the various components. The rotatable hub can provide controlled rotation, even when the steering linkage 22 does not extend perpendicularly from the gimbal assembly. A similar assembly can be provided in the steering plate 20. Thus, as shown for example in FIG. 3, even when the steering plate and the rotatable hub are not aligned in the same plane, the steering linkage can provide connectivity between the two while allowing rotation of the steering plate in response to rotation of the rotatable hub.

This aspect of the technology allows installation of the system into a variety of vehicles regardless of the relative height of the seat 52b, the steering wheel 54, etc. The gimbal technology in the rotatable hub 28 and the steering plate 20 can provide rotation through 360 degrees of rotation, and can provide rotation when the angle between the steering linkage 22 and the rotatable hub (or steering plate) differs from perpendicular by as much as 25-30 degrees in either direction. The various components of the steering plate and rotatable hub can cooperatively function, as one of ordinary skill in the art having possession of this disclosure would readily appreciate.

Operation of the foot pedals of the vehicle by way of legs 18a, 18b can also be provided in a variety of manners. In one aspect, the leg segment 16 of the assembly can include a pair of so-called RAM ball mounts that can controllably rotate relative to the leg segment. The legs 18a, 18b can be coupled to the rotating balls by way of ball and socket joints 26a, 26b. The legs can include push/pull motors or actuators that cause feet of the leg segment to be controllably pivoted relative to the legs. In this manner, both rotation and angular actuation of the feet of the leg segments can be controlled to operate the foot pedals of the vehicle.

Thus, the applique system can be easily installed within a vehicle in a short period of time (less than ten minutes in some cases). Once installed, the system provides full functionality for tele-operation of the vehicle. Due to the very compact nature of the applique, however, a human operator can sit atop the assembly, when the assembly in positioned in the vehicle, to allow the operator to manually operate the vehicle if desired.

Movement of the various moveable components (the rotatable hub 28, the legs 18*a*, 18*b*, etc.) can be provided using a number of electric or other motors, as would be appreciated by one of ordinary skill in the art having possession of this disclosure. Exemplary motor units are shown schematically at 62 in FIG. 1. Control of the motors can be provided using a variety of techniques. For example, input/output ("I/O") ports or panels 64 (FIG. 1) can be utilized to provide control and feedback signals for the system. A master control (not shown explicitly) can be located on or within the assembly, or it can be located remotely. Various wireless and wired technologies can be used to provide the tele-operation control desired. One of ordinary skill in the art, having possession of this disclosure, could readily appreciate the use of such known systems to control and monitor the components of the present technology.

Figure 7:
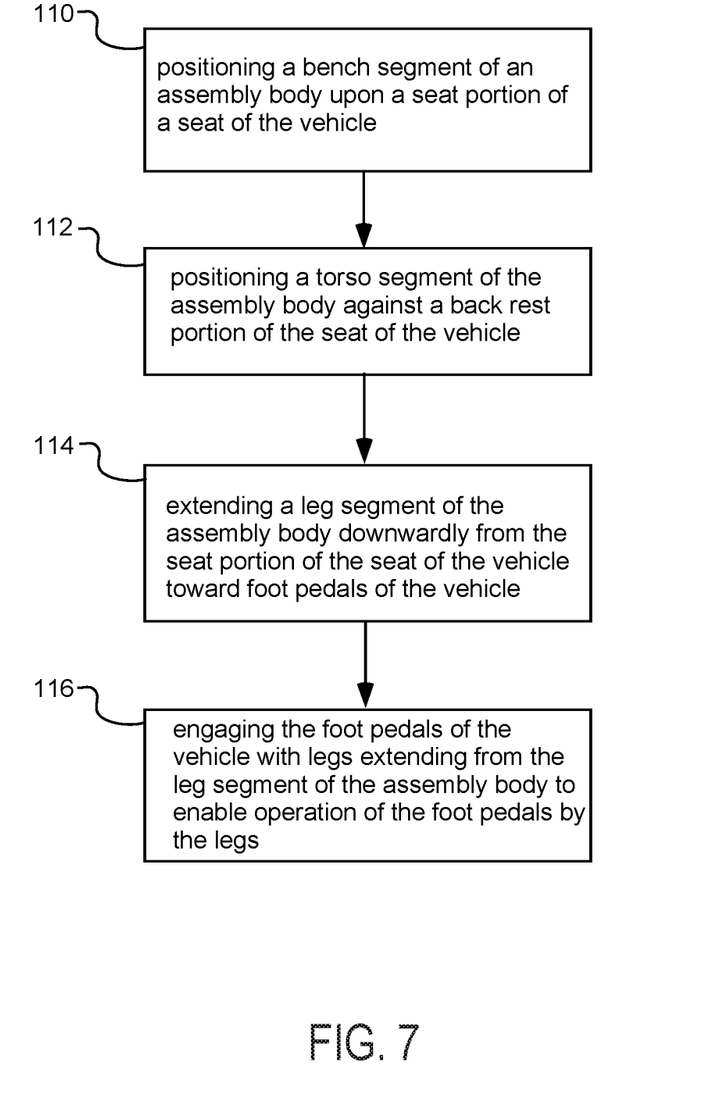
FIG. 7 is a flowchart illustrating an exemplary method in accordance with an aspect of the invention.

In addition to the structure shown and described herein, the present technology also provides various methods of retrofitting vehicles for tele-operation, tele-operating such vehicles, etc. In one specific example, a method of providing unmanned operational capability to a manually controllable vehicle is provided, including: positioning (110) a bench segment of an assembly body upon a seat portion of a seat of the vehicle; positioning (112) a torso segment of the assembly body against a back rest portion of the seat of the vehicle; extending (114) a leg segment of the assembly body downwardly from the seat portion of the seat of the vehicle toward foot pedals of the vehicle; and engaging (116) the foot pedals of the vehicle with legs extending from the leg segment of the assembly body to enable operation of the foot pedals by the legs.

The method can further include engaging a steering wheel of the vehicle with a steering linkage extending from the torso segment, to enable operation of the steering wheel by the steering linkage. The method can further include returning the vehicle to a manually controllable state by removing the steering extension and legs from the vehicle while the assembly body remains within the vehicle. The method can include removing the body assembly from the vehicle and storing the assembly body in folded condition. A user can be positioned upon the assembly body while the assembly body remains in the vehicle.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of providing unmanned operational capability to a manually controllable vehicle, comprising:
    obtaining an assembly body, including a bench segment, a torso segment and a leg segment folded into a folded configuration such that the bench segment, torso segment and leg segment stack atop one another;
    unfolding and positioning a bench segment of an assembly body upon a seat portion of a seat of the vehicle;
    unfolding and positioning a torso segment of the assembly body against a back rest portion of the seat of the vehicle;
    unfolding and extending a leg segment of the assembly body downwardly from the seat portion of the seat of the vehicle toward foot pedals of the vehicle; and
    engaging the foot pedals of the vehicle with legs extending from the leg segment of the assembly body to enable operation of the foot pedals by the legs.

2. The method of claim 1, further comprising engaging a steering wheel of the vehicle with a steering linkage extending from the torso segment, to enable operation of the steering wheel by the steering linkage.

3. The method of claim 1, wherein the torso segment is foldable relative to the bench segment, and wherein the bench segment is foldable relative to the leg segment, to allow the segments to be foldable into a compact configuration.

4. The method of claim 1, further comprising returning the vehicle to a manually controllable state by removing the steering extension and legs from the vehicle while the assembly body remains within the vehicle.

5. The method of claim 4, further comprising positioning an operator upon the assembly body while the assembly body remains in the vehicle and engaging the foot pedals of the vehicle with feet of the operator.

6. The method of claim 1, further comprising removing the body assembly from the vehicle and storing the assembly body in the folded condition.

7. A robotic applique assembly for incorporation into a manually controllable vehicle to provide unmanned operational capability to the vehicle, the assembly comprising:
    an assembly body configured to be positioned into the vehicle in an area normally occupied by a user of the vehicle, the body having a series of segments including:
        a torso segment;
        a bench segment; and
        a leg segment; and
    a steering linkage, coupleable to the torso segment, the steering linkage coupleable to a steering wheel of the vehicle so as to be controllable by the applique assembly;
    wherein the segments are pivotally coupled one to another to allow adjustment of position of the segments relative to one another; and
    wherein the torso segment, bench segment and leg segments are foldable atop one another to allow the assembly to be folded into a compact configuration when removed from the vehicle.

8. The assembly of claim 1, further comprising one or more moveable feet, coupleable to the leg segment, the moveable feet being positionable so as to allow operation of foot pedals of the vehicle by the moveable feet.

9. The assembly of claim 8, wherein the moveable feet are removably coupleable to the leg segment, so as to be removable for carriage and storage of the assembly.

10. The assembly of claim 1, wherein the compact configuration has a total width of about sixteen inches, a total height of about ten inches, and a total depth of about twenty-three inches.

11. The assembly of claim 1, wherein each of the segments has a thickness of less than about 2.75 inches.

12. The assembly of claim 1, wherein the assembly has a total weight of less than about fifty pounds.

13. The assembly of claim 1, wherein a human operator can sit atop the assembly, when the assembly in positioned in the vehicle, and manually operate the vehicle while the assembly is positioned in the vehicle.

14. A robotic applique assembly for incorporation into a manually controllable vehicle to provide unmanned operational capability to the vehicle, the assembly comprising:
  a bench segment positionable upon a seat portion of a seat of the manually controllable vehicle;
  a torso segment positionable against a back rest portion of the seat of the manually controllable vehicle, the torso segment including a rotatable hub associated therewith;
  a leg segment extending downwardly from the seat portion of the seat of the vehicle toward foot pedals of the vehicle;
  a steering extension, coupleable to the rotatable hub of the torso segment, the steering extension sized to extend from the torso segment to an area adjacent a steering wheel of the manually controllable vehicle; and
  a steering plate, coupleable to the steering extension and to a steering wheel of the manually controllable vehicle;
  the steering plate, steering extension and rotatable hub cooperatively allowing unmanned control of the steering system of the manually operable vehicle; wherein
  the torso segment, bench segment and leg segments are foldable atop one another to allow the assembly to be folded into a compact configuration when removed from the vehicle.

15. The assembly of claim 14, wherein the rotatable hub includes one or more components that are rotatable relative to the torso segment.

16. The assembly of claim 14, wherein the steering extension is adjustable in length.

17. The assembly of claim 16, wherein the steering extension includes one or more removable pins that allow a length of the steering extension to be adjusted.

18. The assembly of claim 17, wherein the steering extension includes one or more components arranged telescopically relative to one another.

* * * * *